United States Patent [19]

Dyer

[11] Patent Number: 4,988,582
[45] Date of Patent: Jan. 29, 1991

[54] COMPACT FUEL CELL AND CONTINUOUS PROCESS FOR MAKING THE CELL

[75] Inventor: Christopher K. Dyer, Chatham, N.J.

[73] Assignee: Bell Communications Research, Inc., Livingston, N.J.

[21] Appl. No.: 521,115

[22] Filed: May 4, 1990

[51] Int. Cl.$^5$ ............................................. H01M 8/10
[52] U.S. Cl. ......................................... 429/30; 429/32; 29/623.5; 427/115
[58] Field of Search ..................... 429/30, 32, 33, 40, 429/42, 44, 12, 94, 191, 210; 29/623.5; 427/115

[56] References Cited

U.S. PATENT DOCUMENTS

| | | | |
|---|---|---|---|
| 3,423,243 | 1/1969 | Kordesch et al. | 429/12 |
| 3,505,114 | 4/1970 | Rohr | 429/32 |
| 4,824,741 | 4/1989 | Kunz | 429/34 X |
| 4,857,420 | 8/1989 | Maricle et al. | 429/30 |
| 4,876,163 | 10/1989 | Reichner | 429/30 |
| 4,913,982 | 4/1990 | Kotchick et al. | 429/12 |

*Primary Examiner*—Anthony Skapars
*Attorney, Agent, or Firm*—James W. Falk; Leonard C. Suchyta

[57] ABSTRACT

An elongated multi-layered structure including multiple symmetrical two-sided fuel cells is made by a low-cost continuous process. Each cell assembly derived from the structure comprises two basis cells having a common positive electrode. By rolling each cell assembly into a spiral, a compact package having two cells connected in parallel and characterized by a relatively large current capabilty is realized. In the spiral package, conductive corrugations are utilized between adjacent surfaces of the rolled assembly to ensure that a fuel/oxidizer mixture can access permeable electrodes formed on the respective surfaces of the assembly.

20 Claims, 2 Drawing Sheets

COMPACT FUEL CELL AND CONTINUOUS PROCESS FOR MAKING THE CELL

BACKGROUND OF THE INVENTION

This invention relates to fuel cells and, more particularly, to cells which consume gaseous or liquid fuels and produce electrical energy.

An advantageous full cell for energy conversion is described in my U.S. Pat. No. 4,863,813. In a cell of the type described therein, a hydrogen-containing material at room temperature, such as a gaseous mixture of hydrogen and oxygen, is directly coverted to direct-current electrical energy and the only reaction product is water.

In one specific illustrative such cell, a submicrometer-thick gas-permeable ionically conducting membrane made of pseudoboehmite is deposited on an electrode that comprises a platinized impermeable substrate. A layer, of platinum for example, is deposited on the top surface of the membrane to form the second electrode of the cell. The second electrode is porous enough to allow the gas mixture to pass into the membrane.

For a hydrogen/air mixture, such a cell provides useful current at an output voltage as large as about one volt, independent of the ratio of hydrogen to air for hydrogen $>50\%$. While the voltage and current provided by the basic cell are adequate for many applications of practical interest, I recognized that it would be desirable to try to devise a compact version of the basic cell that would be capable of providing higher current and power. Such a version, particularly if it were adapted to be made by low-cost continuous fabrication techniques, would significantly increase the applications for which the cell would be regarded as an attractive energy source.

SUMMARY OF THE INVENTION

In accordance with the principles of the present invention, multiple fuel cells each of the type mentioned above are formed in an elongated structure in a continuous fabrication process. The elongated structure is then cut into sections to form multiple individual fuel cell assemblies. Subsequently, each individual cell assembly is rolled to form a compact spiral package. Corrugated members are included in each package to ensure that the fuel mixture has easy access to virtually the entire surface area of the porous electrode of each basic cell.

In a particular embodiment of the invention, the elongated structure comprises a symmetrical two-sided multi-layered member combined with a corrugated conductive member. Each individual fuel cell assembly cut from the structure constitutes two basic cells having a common positive electrode. When the cell assembly is rolled to form a spiral, the negative electrodes of the basic cells are electrically connected together by the corrugated member thereby connecting the two cells in parallel.

In the spiral package, the outer surface of the package constitutes the negative terminal of the fuel cell assembly. The positive terminal of the assembly comprises, for example, a longitudinally extending conductive element positioned within the spiral and in contact with the common positive electrode.

BRIEF DESCRIPTION OF THE DRAWING

A complete understanding of the present invention and of the above and other features and advantages thereof will be apparent from a consideration of the detailed description below taken in conjunction with the accompanying drawing, not drawn to scale, in which.

DETAILED DESCRIPTION

In accordance with the principles of the present invention, basic fuel cells of the type described in U.S. Pat. No. 4,863,813 are made by a continuous process. In this process, an elongated structure is formed. Subsequently, the structure is cut to form multiple sections each of which is then packaged to form an individual fuel cell assembly.

Although the continuous process described herein is adapted to form an elongated single-sided structure, it is generally advantageous to control the process to form an elongated two-sided structure. Accordingly, emphasis below will be directed to fabrication of such a two-sided structure.

The individual sections obtained from the elongated structure can be packaged in a variety of ways. Rolling such a section to form a compact spiral package is particularly advantageous. A fuel cell assembly packaged in this form is characterized by a relatively large current capability in a small volume. Hence, by way of a specific illustrative example, the assemblies specified below will be described as being packaged in spiral form.

Figure 1:
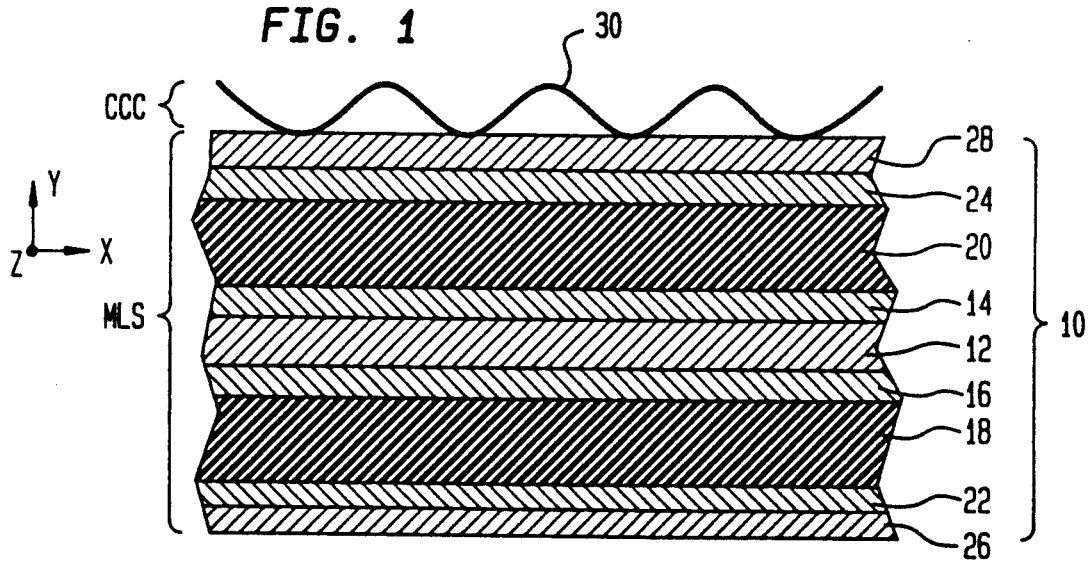
FIG. 1 is a representation in cross-section of a portion of an elongated structure fabricated in accordance with the principles of the present invention from which individual fuel cell assemblies are made.

FIG. 1 shows a portion of a two-sided multi-layered structure 10 made in accordance with the principles of this invention. The structure is manufactured in a continuous process that utilizes standard deposition techniques. In this way, a relatively low-cost elongated structure is fabricated. In turn, multiple individual fuel cell assemblies are formed from sections cut from the elongated structure.

The center element 12 shown in FIG. 1 comprises a carrier onto whose respective sides materials are deposited in sequence during fabrication of the elongated structure. In practice, the carrier element 12 is, for example, moved through successive deposition chambers where at each step specified layers are simultaneously formed on the top and bottom thereof.

The element 12 of FIG. 1 comprises, for example, an elongated conductive foil or tape made of a material such as aluminum or nickel. Alternatively, the element 12 may be a three-layered structure comprising a nonconductive core layer having conductive layers deposited on the top and bottom surfaces thereof.

In the herein-described continuous fabrication process, thin catalyst layers 14 and 16 (FIG. 1) are formed directly on the top and bottom surfaces of the carrier element 12. As described in U.S. Pat. No. 4,863,813, various materials are suitable for forming such catalyst layers. These materials include platinum, palladium, gold, nickel and various alloys of these materials. Other suitable catalytic materials include non-metals such as electronically conducting mixed oxides with a spinel or perovskite structure. Such layers are simultaneously formed on the respective surfaces of the carrier 12 in a standard deposition process. Each of the layers 14 and 16 is deposited to a thickness of, for example, about 10-to-500 nanometers (nm). Together, the carrier 12 and the layers 14 and 16 are designed to be impermeable to the particular fuel/oxidizer mixtures (specified later below) that are utilized to power individual fuel cell assemblies made from the structure 10.

To ensure that fuel cell assemblies derived from the multi-layered structure 10 of FIG. 1 exhibit a relatively high power density in a compact size, it is advantageous that the top and bottom surfaces of the carrier element 12 have irregular surfaces. Such irregularities may be inherent in the materials utilized to form the element 12. If irregularities are not inherent in those surfaces, the surfaces can be processed in a standard way, for example by etching, to achieve the desired irregularities. In either case, what is desired is an actual surface area that is, for example, about an order of magnitude greater than the apparent area of the top and bottom surfaces of the element 12 as measured by its overall dimensions in the indicated X and Z directions. In turn, the areas of the thin layers 14 and 16 deposited on the irregular surfaces of the element 12 correspond closely to the areas of the respective irregular surfaces.

Next, layers 18 and 20 shown in FIG. 1 are simultaneously formed on the layers 14 and 16, respectively. Each of the layers 18 and 20 comprises a solid electrolyte. In accordance with this invention, and as described in more detail in U.S. Pat. No. 4,863,813, each of the layers 18 and 20 is made of a material that is characterized by a usefully high conductivity for hydrogen ions ($H^+$) or hydronium ions ($H_3O^+$). Additionally, each of the layers 18 and 20 is permeable to the fuel, to the oxidizer and to the products of the reaction between the fuel and oxidizer. Further, each of the layers 18 and 20 constitutes an electron insulator, with a resistivity of at least about $10^6$ ohm-centimeters. Also, in preferred embodiments the solid electrolyte is capable of being made in very thin layers, often below one micrometer ($\mu m$) in thickness.

In accordance with the principles of the present invention, two classes of solid-electrolyte materials are suitable for forming the layers 18 and 20 shown in FIG. 1. One class consists of selected hydrated aluminum oxides. The other class consists of selected polymeric materials.

The physical properties and conditions for forming layers of hydrated aluminum oxide have been extensively studied. A review of many of these studies appears as Chapter 3 of "Oxides and Oxide Films", edited by J. W. Diggle and N. K. Vijh, volume 4, Marcer Dekker, New York, 1976, pages 169–253. Depending on the particular conditions, the product of the reaction between aluminum and water includes boehmite, pseudoboehmite, bayerite, gibbsite and combinations of these materials. One of these materials, pseudoboehmite, has been found to be particularly appropriate for inclusion in devices made in accordance with the invention. Layers including at least 50% pseudoboehmite are preferred, layers including at least 95% pseudoboehmite being most preferred.

Suitable permeable solid-electrolyte layers of hydrated aluminum oxide can be produced by several methods. For example, such a layer forms on a clean metallic aluminum surface exposed to water in liquid form in a container or exposed to water in vapor form in a chamber in a temperature range of about 20-to-374 degrees Celsius. Pseudoboehmite is predominant in layers produced in the temperature range from approximately 90-to-100 degrees Celsius. Solid-electrolyte layers can also be produced by exposing aluminum oxide to water and/or liquid vapor phases. The pseudoboehmite form is predominant in layers produced in the temperature range of about 90-to-100 degrees Celsius.

Suitable aluminum oxide layers can also be produced by anodization of metallic aluminum. Thicker layers can be produced by a multi-layer process that includes alternate steps of aluminum deposition and exposure of the aluminum or anodized aluminum surface to water. Radio-frequency backsputtering can be used during deposition of the metallic aluminum prior to water exposure. Such backsputtering can improve the uniformity of coverage of the aluminum and therefore also of the permeable solid-electrolyte layer.

The production of a hydrated aluminum oxide layer from an anodically formed aluminum oxide layer has the advantage that such a layer is characteristically of a very uniform thickness and can be grown precisely to a specified thickness. In the multi-layer process comprising sequential aluminum depositions, solid-electrolyte layers of approximately 500 nm thickness have been produced with 3-to-5 sequential processing steps. More generally, hydrated aluminum oxide layers about 300 nm-to-10 $\mu m$ thick are suitable for forming the solid-electrolyte layers 18 and 20 shown in FIG. 1.

Additionally, carbon-based polymeric materials are known which possess the required hydrogen ion conductivity, electronic resistivity and permeability to fuel, oxidizer and products of the reaction between them. Perfluorinated sulfonic acid is an example of a polymer in which ionic hydrogen species can be readily mobilized. This supplies the necessary hydrogen ion mobility. Such polymers commonly have sufficient gas permeability and electronic resistance to be useful as solid electrolytes in assemblies made in accordance with the principles of the present invention.

One specific illustrative polymeric material suitable for forming the solid-electrolyte layers 18 and 20 (FIG. 1) is the commercially available perfluorinated sulfonic acid polymer known as Nafion. In practice, this material is much easier to use than pseudoboehmite because Nafion can be solution-cast to form thin layers in the range of about 1-to-10 $\mu m$. Such a fabrication technique is particularly compatible with the continuous process described herein.

Subsequently, layers 22 and 24 are simultaneously deposited on the surfaces of the solid-electrolyte layers 18 and 20, respectively. Each of the layers 22 and 24 comprises a permeable catalytic electrode made of a material such as, for example, platinum, palladium, gold, nickel or alloys of these materials. Other suitable catalytic materials include non-metals such as electronically conducting mixed oxides with a spinel or perovskite structure. Each of the layers 22 and 24 is permeable in the sense that it permits the fuel/oxidizer mixture to pass into its respectively adjoining solid-electrolyte layer. Illustratively, this can be realized by sputtering a thin inherently porous layer, up to, for example, a thickness of about 100 nm on the surface of each of the solid-electrolyte layers 18 and 20. For thicker layers that do not inherently exhibit the required porosity to the fuel- /oxidizer mixture, the layers 22 and 24 can be rendered permeable by forming therein a pattern of through-apertures.

The multi-layered structure 10 depicted in FIG. 1 comprises in effect two elongated fuel cells each of the type described in U.S. Pat. No. 4,863,813. One such cell comprises the carrier element 12 and the layers 16, 18 and 22, in that order, on the bottom surface of the element 12. The other cell comprises the carrier element 12 and the layers 14, 20 and 24, in that order, on the top surface of the element 12. In this two-sided elongated structure, the element 12 comprises a common positive electrode for the two cells. And the layers 22 and 24 constitute the respective negative electrodes of the two elongated cells.

For reasons that will be apparent later below, it is generally advantageous to include two additional layers 26 and 28 in the elongated multi-layered structure represented in FIG. 1. The layer 26 is formed on the bottom surface of the catalytic layer 22, while the layer 28 is simultaneously formed on the top surface of the catalytic layer 24.

Illustratively, each of the layers 26 and 28 of FIG. 1 comprises a standard conductive polymer that is permeable to the fuel/oxidizer mixture. Many polymers are known which posses the required permeability and electronic conductivity to serve as the layers 26 and 28. Alternatively, each of the layers 26 and 28 may comprise a conventional carbon-fiber-mesh material. Such a material also exhibits the requisite permeability and electronic conductivity.

The elongated multi-layered structure 10 is now complete. What remains to be done is to add a contacting instrumentality to the multi-layered structure and then to sever the overall structure into sections which are subsequently packaged.

In accordance with the principles of the present invention, electrical contact is made to one surface of the multi-layered structure 10 shown in FIG. 1 by an elongated instrumentality that does not significantly interfere with the passage of the fuel/oxidizer mixture to that surface. Illustratively, such contact is made to the top surface of the FIG. 1 structure by a conductive corrugated current collector 30. The previously described conductive layer 28 serves to enhance electrical contact between the corrugated collector 30 and the permeable layer 24, thereby reducing the internal resistance of fuel cell assemblies made from the depicted structure. If desired, however, it is feasible to omit the layer 28 whereby the collector 30 would then be in direct electrical contact with the layer 24.

By way of example, the current collector 30 shown in FIG. 1 comprises a corrugated strip of a conductive material such as aluminum foil or tape. Alternatively, the collector 30 may comprise a corrugated strip of a conductive polymeric foil or tape.

Figure 2:
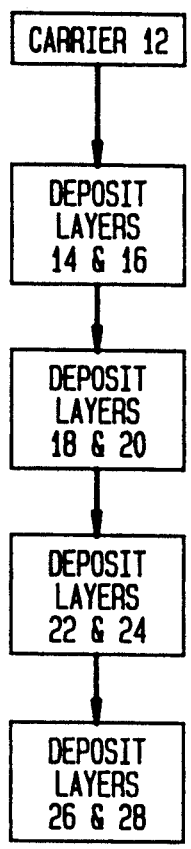
FIG. 2 represents the continuous process sequence in accordance with which the multi-layered portion of the elongated structure of FIG. 1 is made.

The aforedescribed continuous process sequence by which the multi-layered structure 10 of FIG. 1 is fabricated is represented diagrammatically in FIG. 2. Based on such an efficient process, fuel cell assemblies of the type described in U.S. Pat. No. 4,863,813 can be made in a relatively low-cost way.

Figure 3:
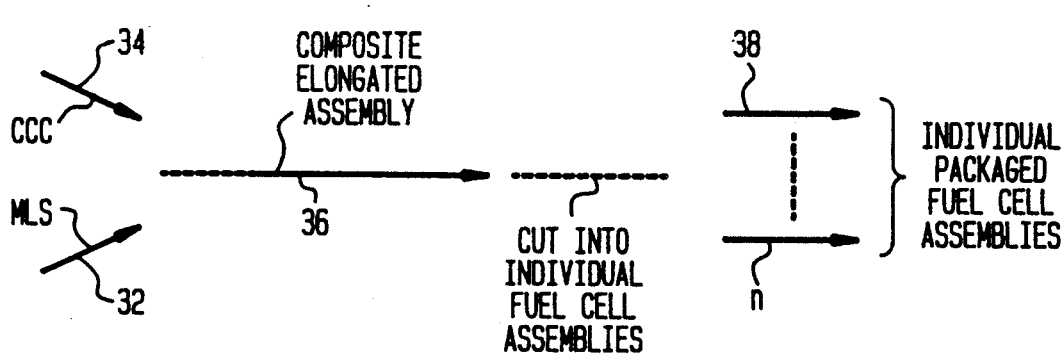
FIG. 3 is a simplified diagrammatic depiction that illustrates the way in which the structure of FIG. 1 is processed to form individual fuel cell assemblies.

FIG. 3 illustrates in an overall schematic way the manner in which individual fuel cell assemblies are fabricated in accordance with the present invention. Arrow 32 in FIG. 3 represents an elongated multi-layered structure (MLS) of the type described above and designated in FIG. 1 by reference numeral 10. Arrow 34 in FIG. 3 represents an elongated conductive current collector (CCC) such as the collector 30 shown in FIG. 1. As indicated in FIG. 3, these elongated components represented by the arrows 32 and 34 are combined to form a composite elongated assembly represented by arrow 36. This composite assembly corresponds to the combination of the MLS 10 and CCC 30 shown in FIG. 1.

The elongated composite assembly 36 of FIG. 3 is then cut into multiple sections. Lastly, the sections are respectively packaged to form individual fuel cell assemblies, as represented by arrows 38. . . n in FIG. 3.

Figure 4:
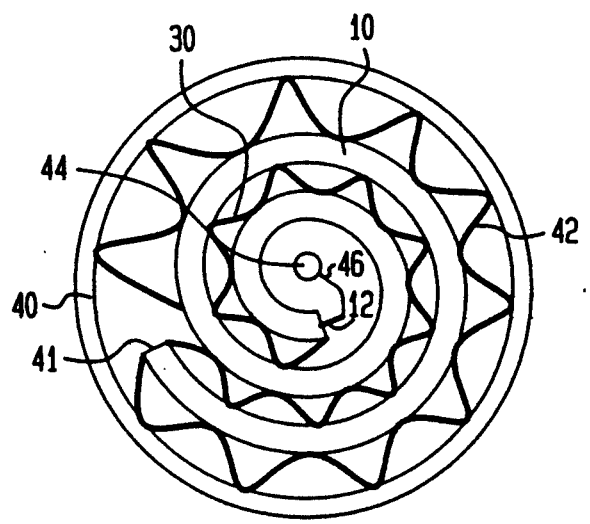
FIG. 4 shows an individual fuel cell assembly derived from the FIG. 1 structure rolled to form a spiral package.

FIG. 4 shows an individual fuel cell assembly of the type described above that has been rolled to form a compact spiral package. In the spiral package, the current collector is in electrical contact with both the top and bottom surfaces of the multi-layered structure 10. As indicated above, the layer 28 shown in FIG. 1 enhances the electrical contact between the collector 30 and one surface or electrode of the structure 10 in the spiral package. Similarly, the layer 26 shown in FIG. 1 improves the electrical contact between the collector 30 and the other surface or electrode of the structure 10 in the spiral package. Thus, the collector 30 serves to electrically interconnect what were formerly top and bottom electrodes of the structure 10. In the spiral package, the collector 30 constitutes the common negative electrode of the indicated assembly. It is thus apparent that the depicted spiral assembly comprises two basic fuel cell connected in parallel.

By way of example, the spiral package assembly of FIG. 4 is shown placed in an open-ended container 40. Illustratively, the container 40 is made of a conductive material such as aluminum. To ensure that the fuel/oxidizer mixture will have access to virtually the entire surface of the multi-layered structure 10 that faces the inside surface of the container 40, a conductive current collector 42 that is identical to the collector 30 is interposed between the surfaces. The collector 42 also serves to electrically interconnect the surfaces. Thus, the outside surface of the conductive container 40 comprises the negative terminal of the packaged spiral assembly.

Alternatively, the conductive current collector 42 shown in FIG. 4 may simply comprise an extended portion of the collector 30. More specifically, a continuous corrugation including the collector 30 could extend around end 41 of the multi-layered structure 10 and then extend between the structure 10 and the container 40 in the exact manner in which the collector 42 does. In that case, care must be taken to avoid electrical contact between such a continuous collector and the positive carrier element 12 of the structure 10 in the vicinity of the end 41.

In FIG. 4, a longitudinally extending conductive rod 44 whose main axis is parallel to the indicated Z axis is shown electrically connected by lead 46 to a deposit-free portion of the carrier element 12 included in the multi-layered structure 10. Thus the rod 44, which may, for example, be made of aluminum, constitutes the positive terminal of the depicted fuel cell assembly.

The conductive rod 44 of FIG. 4 can be mechanically mounted in the spiral package assembly in a variety of conventional ways. Thus, for example, the length of the rod within the container 40 may be designed to exceed the Z-direction extent of the fuel cell components 10, 30 and 42. In that case, the ends of the rod can be mechanically secured to the container 40 by suitable insulating support members (not shown). Also, it is advantageous to provide an insulating coating on the rod 44 to ensure that electrical contact between the rod 44 and negative surfaces of the indicated assembly is avoided.

As indicated above, the front and back of the FIG. 4 container are open. The required fuel/oxidizer mixture flows in a direction parallel to the Z axis into the front of the container 40. Water, the sole by-product of the reaction that occurs in the depicted fuel cell assembly for a hydrogen/oxygen mixture, leaves the container through its open back.

Suitable fuels that are consumed by assemblies made in accordance with the invention in order to produce electrical energy are hydrogen-containing materials such as hydrogen, methane and methanol. The fuels can be supplied to the assemblies in liquid or gaseous form.

Further, many suitable oxidizers or oxidizer species are available for combining with the fuel to provide a mixture suitable for powering the fuel cell assemblies described herein. In practice, the most common oxidizer is gaseous oxygen or air.

It is to be understood that the various specific arrangements described herein are only illustrative of the application of the principles of the present invention. In accordance with these principles, numerous alternatives and modifications may easily be made by those skilled in the art without departing from the spirit and scope of the invention.

Finally, it is noted that my commonly assigned co-pending application Ser. No. 07/512117, filed Apr. 20, 1990, is directed to a modular assembly comprising two or more individual fuel cells connected together to provide an output voltage that is two or more times that of a single cell. In the modular assembly, corrugated current collectors interconnect adjacent cells. Further, the modular assembly described in that application is advantageously made by a continuous process and packaged in a spiral form.

What is claimed is:

1. A continuous method for fabricating an elongated assembly from which multiple individual fuel cell assemblies are made, comprising the steps of
    simultaneously forming on the respective surfaces of an elongated carrier element electrodes that are impermeable to a fuel and an oxidizer,
    simultaneously forming on the respective surfaces of said electrodes solid-electrolyte layers that consist essentially of an electronically insulating material that is also ionically conducting to at least a first ionic species and which material is permeable to the fuel, to the oxidizer and to the products of electrochemical reactions of the fuel and oxidizer,
    and simultaneously forming on the respective surfaces of said solid-electrolyte layers electrodes that are permeable to the fuel and the oxidizer.

2. A method as in claim 1 further including the step of simultaneously forming on the respective surfaces of said permeable electrodes layers that are electronically conducting and permeable to the fuel and the oxidizer.

3. A method as in claim 2 further including the step of
    disposing an elongated conductive member that is permeable to the fuel and the oxidizer in electrical contact with the surface of one of said conductive permeable layers to form a composite elongated assembly.

4. A method as in claim 3 wherein said elongated conductive permeable member comprises a corrugated member.

5. A method as in claim 4 further including the step of cutting said elongated assembly into sections.

6. A method as in claim 5 further including the step of rolling each of said sections to form a spiral assembly.

7. A method as in claim 6 further including the steps of
    disposing a conductive corrugated member in electrical contact with the surface of said spiral assembly,
    and placing said assembly in a conductive container such that said second-mentioned corrugated member is in electrical contact with the inner surface of said container.

8. A method as in claim 7 further including the step of mounting a conductive rod within said spiral assembly in electrical contact with the carrier element included in said assembly.

9. An assembly made by the method of claim 1.

10. A two-sided fuel cell assembly comprising
    a carrier element having two major opposed surfaces,
    first and second electrodes respectively formed on said major opposed surfaces, the combination of said electrodes and said element being impermeable to a fuel and an oxidizer,
    solid-electrolyte layers respectively formed on said first and second electrodes, said solid-electrolyte layers consisting essentially of an electronically insulating material that is also ionically conducting to at least a first ionic species and which material is permeable to the fuel, to the oxidizer and to the products of electrochemical reactions of the fuel and oxidizer,
    and third and fourth electrodes that are permeable to the fuel and the oxidizer respectively formed on said solid-electrolyte layers.

11. An assembly as in claim 10 wherein at least surface regions of said carrier element are conductive.

12. An assembly as in claim 11 wherein each of said solid-electrolyte layers comprises a material selected from the group consisting of a hydrated oxide of aluminum and a carbon-based polymer.

13. An assembly as in claim 12 wherein each of said first, second, third and fourth electrodes comprises a material selected from the group consisting of platinum, palladium, gold, nickel, alloys of platinum, gold and nickel, and electronically conducting mixed oxides.

14. An assembly as in claim 13 further including conductive current collecting means that is permeable to the fuel and the oxidizer in electrical contact with the surface of one of said third and fourth electrodes.

15. An assembly as in claim 14 wherein said current collecting means comprises a corrugated member.

16. An assembly as in claim 15 wherein a permeable conductive layer is interposed between said corrugated member and the said one of said third and fourth electrodes.

17. An assembly as in claim 16 which is rolled to form a spiral package, and further including a conductive corrugated member in electrical contact with the surface of said spiral package.

18. An assembly as in claim 17 wherein said spiral package is housed within a conductive container, said second-mentioned corrugated member being in electrical contact with the inner surface of said container.

19. An assembly as in claim 18 further including a conductive rod within said spiral package in electrical contact with surface regions of said carrier element.

20. An assembly as in claim 19 wherein the fuel comprises at least one member of the group consisting of hydrogen, methane and methanol, wherein the oxidizer comprises oxygen, and wherein the container and said rod constitute the negative and positive terminals, respectively, of said assembly.

* * * * *

UNITED STATES PATENT AND TRADEMARK OFFICE
CERTIFICATE OF CORRECTION

PATENT NO. : 4,988,582

DATED : January 29, 1991

INVENTOR(S) : Christopher K. Dyer

It is certified that error appears in the above-identified patent and that said Letters Patent is hereby corrected as shown below:

Abstract, line 4, "basis" should read --basic--.
Column 1, line 9, "full" should read --fuel--.
Column 5, line 26, "posses" should read --possess--.

Signed and Sealed this

Twenty-third Day of June, 1992

*Attest:*

DOUGLAS B. COMER

*Attesting Officer*      *Acting Commissioner of Patents and Trademarks*